United States Patent

Onoda et al.

[11] Patent Number: 5,541,452
[45] Date of Patent: Jul. 30, 1996

[54] IC CARD

[75] Inventors: Shigeo Onoda, Itami; Kiyotaka Nishino, Sanda, both of Japan

[73] Assignee: Mitsubishi Denki Kabushiki Kaisha, Tokyo, Japan

[21] Appl. No.: 377,611

[22] Filed: Jan. 25, 1995

[30] Foreign Application Priority Data

Jan. 31, 1994 [JP] Japan .................................. 6-009783

[51] Int. Cl.⁶ .......................... H01L 23/34; H01L 23/02; H05K 1/14; G06K 19/06
[52] U.S. Cl. .......................... 257/723; 257/679; 235/492; 361/737
[58] Field of Search .................................. 257/723, 679; 235/492; 361/737

[56] References Cited

U.S. PATENT DOCUMENTS 5,173,841  12/1992  Uenaka et al. ........................... 235/492

FOREIGN PATENT DOCUMENTS

| 494684 | 1/1992 | European Pat. Off. . |
| 9101533 | 7/1990 | Germany . |
| 2107496 | 4/1990 | Japan . |
| 2301493 | 12/1990 | Japan . |

OTHER PUBLICATIONS

"Electronic Packaging and Interconnection Handbook", pp. 24–7.25 ; C. Harper.

*Primary Examiner*—Sara W. Crane
*Assistant Examiner*—Jhihan Clark
*Attorney, Agent, or Firm*—Leydig, Voit & Mayer

[57] ABSTRACT

An IC card includes a circuit board for mounting electronic parts, a frame surrounding the circuit board, and panel covering each of the front and back sides of the circuit board and the frame. Spacers serving as supporting members are adhered to the circuit board by soldering. Soldering can be performed by the same process as soldering electronic parts to the circuit board so as to prevent deformation of the panels and application of excessive force to the electronic parts even if an external force is applied to the panels.

4 Claims, 4 Drawing Sheets

FIG. 5A
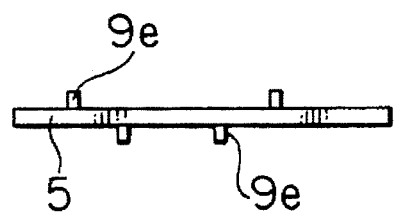
FIG. 5B
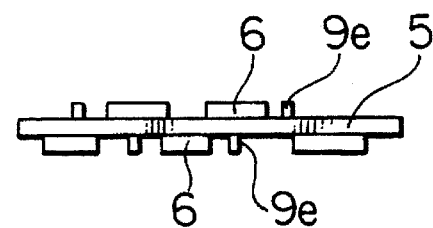
FIG. 6A
PRIOR ART
FIG. 6B
PRIOR ART
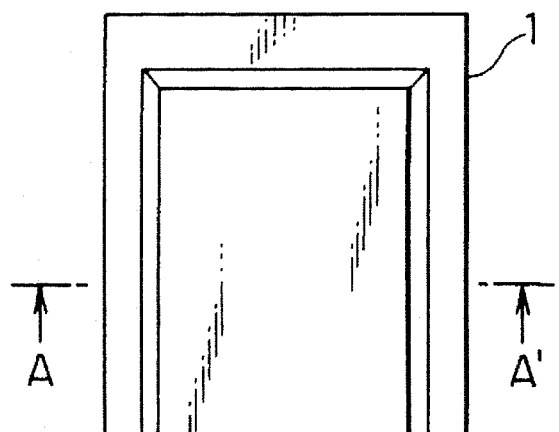
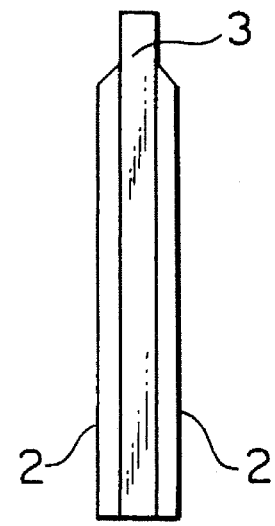

IC CARD

BACKGROUND OF THE INVENTION

1. Field of the Invention

The present invention relates to an IC card, and particularly to an IC card which is not deformed even if external force is applied thereto.

2. Description of the Invention

FIGS. 6 A and 6 B care a plan view and a side view, respectively, illustrating a conventional IC card. In these drawings, reference numeral 1 denotes an IC card; reference numeral 2, a panel covering each of the front and the back sides of the IC card 1; and reference numeral 3, a frame of the IC card 1.

FIG. 7 is a plan view of a module 4 contained in the IC card 1. The module 4 comprises a circuit board 5, electronic parts 6 mounted on the circuit board 5, and a connector 7 connected to the circuit board 5 and electrically and mechanically connected to an external device (not shown). FIG. 8 is a schematic sectional side view taken along line A—A' of the IC card shown in FIG. 6A.

In the conventional IC card constructed as described above, the electronic parts 6 are first mounted on the circuit board 5, and the module 4 connected to the connector 7 is positioned and set in the frame 3. The panels 2 having adhesive sheets 8 adhered thereto are then fitted into the frame 3. Since the adhesive sheets 8 exhibit 1n intrinsic adhesive effect when heat and pressure are applied thereto, the panels 2 are adhered to the frame 3 by pressing and heating the panels 2.

In the above-described IC card, the electronic parts 6 have different heights in some cases, and a gap thus occurs between low electronic parts 6 and the panels 2. There is thus the problem that the panels 2 are deformed by a force applied to the electronic parts 6 when the panels 2 are pressed from outside. Even if the electronic parts are high without a gap between the electronic parts and the panels 2, a force is applied to the electronic pats 6 when the panels are pressed from the outside, thereby causing the problem of damage of the electronic parts, such as cracks in soldered leads (not shown) of the electronic parts 6.

SUMMARY OF THE INVENTION

The present invention has been achieved for solving the above problems, and an object of the invention is to provide an IC card which is not deformed even if an external force is applied thereto, and which can avoid application of excess force to electronic parts in the IC card.

In order to achieve the object, in accordance with an embodiment of the present invention, there is provided an IC card comprising a circuit board on which electronic parts are mounted, a frame surrounding the outer periphery of the circuit board, panels respectively covering the front and back sides of the circuit board and the frame, and supporting members disposed between the circuit board and the panels, providing support in the gap between the circuit board and the panels, wherein the supporting members are soldered to the circuit board.

In accordance with another embodiment of the present invention, there is provided an IC card comprising a circuit board for mounting electronic parts thereon, a frame surrounding the outer periphery of the circuit board, panels respectively covering the front and back sides of the circuit board and the frame, supporting members arranged between the circuit board and the panels providing support in the gaps between the circuit board and the panels, wherein each of said supporting members comprises a member which can be deformed by heating and pressing the panels, and which has a height substantially the same as the gap between the circuit board and the panels.

In accordance with a further embodiment of the present invention, there is provided an IC card comprising a circuit board for mounting electronic parts thereon, a frame surrounding the outer periphery of the circuit board, panels respectively covering the front and back sides of the circuit board and the frame, and supporting members arranged between the circuit board and the panels providing support in the gap between the circuit board and the panels wherein the supporting members are formed integrally with the circuit board.

BRIEF DESCRIPTION OF THE DRAWINGS

FIGS. 5A and 5B are side views illustrating a circuit board of an IC card in accordance with Embodiment 5 of the present invention;

FIGS. 6A and 6B are respectively a plan view and a side view illustrating a conventional IC card;

DESCRIPTION OF THE PREFERRED EMBODIMENTS

Embodiment 1

Figure 1:
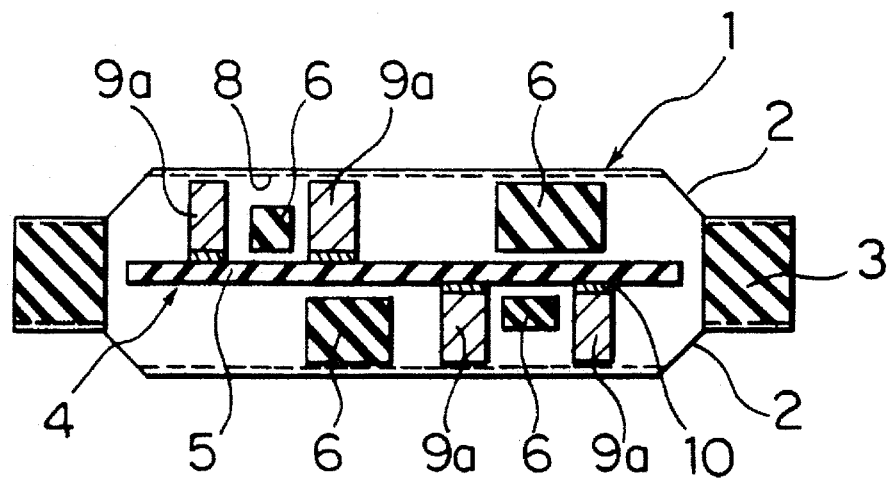
FIG. 1 is a schematic sectional side view illustrating an IC card in accordance with Embodiment 1 of the present invention.

FIG. 1 is a schematic sectional side view illustrating an IC card in accordance with Embodiment 1 of the present invention. In the drawings, the same reference numerals denote the same or corresponding parts. In FIG. 1, spacers 9a serving as supporting members are mounted on a circuit board 5 with solder 10. For example, a metallic chip used as the spacer 9a can be soldered to a pad (not shown) on the circuit board 5. Soldering of the metallic chip can be performed by the same process as soldering electronic parts 6 to the circuit board 5, and thus has the advantage of eliminating the need for an additional process. Since the IC card is provided with the spacers 9a, an external force is applied to the panels by the spacers 9a, and thus prevents deformation of the panels 2 and application of excessive force to the electronic parts 6. Therefore the IC card can effectively be protected.

Embodiment 2

Figure 2:
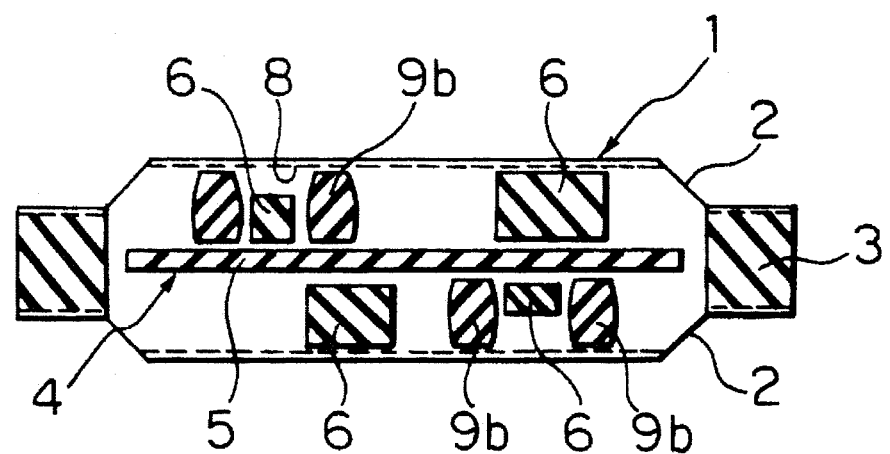
FIG. 2 is a schematic sectional side view illustrating an IC card in accordance with Embodiment 2 of the present invention.

FIG. 2 is a schematic sectional side view illustrating an IC card in accordance with Embodiment 2, In FIG. 2, each of spacers 9b serving as a supporting members comprises a thermosetting resin or thermoplastic resin. After the spacers 9b are arranged between the circuit board 5 and the panels 2, the panels 2 are heated and pressed from the outside so that the height of the spacers 9b is the same as the distance between the circuit board 5 and the panels 2. Heating is performed at a temperature of 100° to 150° C. for 2 hr to 1 min., preferably at a temperature of 120° to 140° C. for 1 hr to 5 minutes. At this time, the pressure is about 10 Kg to 50 Kg in terms of total load. The height of the spacers 9b can appropriately be adjusted by such heating and pressing. Since the IC card provided with the spacers 9b receives an external force applied to the panels 2 at the spacers 9b, deformation of the panels and application of excessive force to the electronic parts 6 are prevented. Therefore, the IC card can effectively be protected, as in Embodiment 1.

Various resins such as epoxy resins, urethane resins, acrylic resins, etc. can be used as the thermosetting resin or thermoplastic resin without limitation.

Embodiment 3

Figure 3:
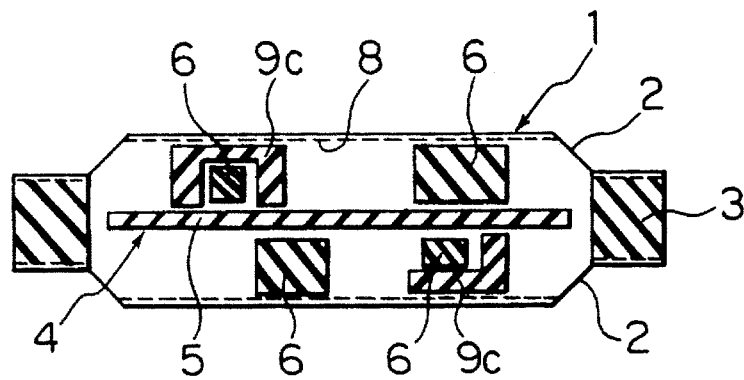
FIG. 3 is a schematic sectional side view illustrating an IC card in accordance with Embodiment 3 of the present invention.

FIG. 3 is a schematic sectional side view illustrating an IC card in accordance with Embodiment 3.

In FIG. 3, each of spacers 9c serving as supporting members comprises a thermosetting resin or a thermoplastic resin. The spacers 9c are arranged in vicinities of the electronic parts 6 or on the electronic parts 6 at the time of assembly. After the frame 3 is covered with the panels 2, the panels 2 are heated and pressed to deform the spacers 9c. Even if the electronic parts 6 have different heights, the spacers 9c can be held between the electronic parts 6 and the panels 2.

The same resins as in Embodiment 2 can be used as the thermosetting resin or thermoplastic resin. When an external force is applied to the panels 2, the spacers 9c receive the external force and thus prevent deformation of the panels 2 and application of excessive force to the electronic parts 6, thereby effectively protecting the IC card.

Embodiment 4

Figure 4A:
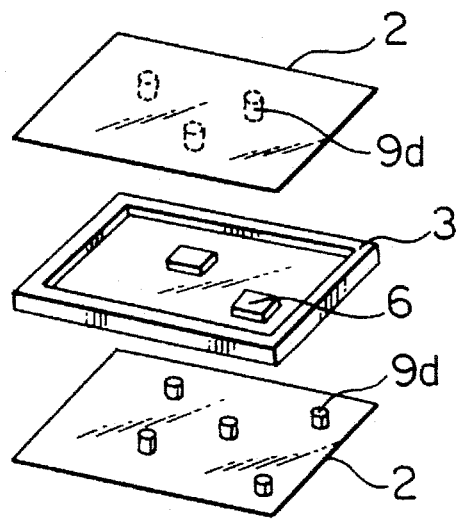
FIGS. 4A and 4B are respectively an exploded perspective view and a schematic sectional side view illustrating an IC card in accordance with Embodiment 4 of the present invention.
Figure 4B:
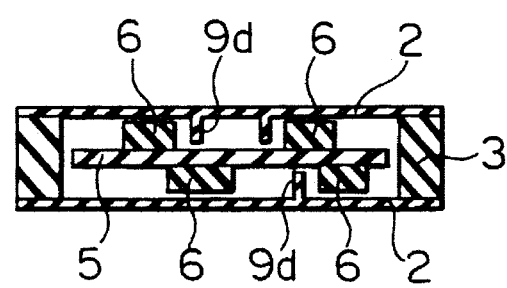
Figure 7:
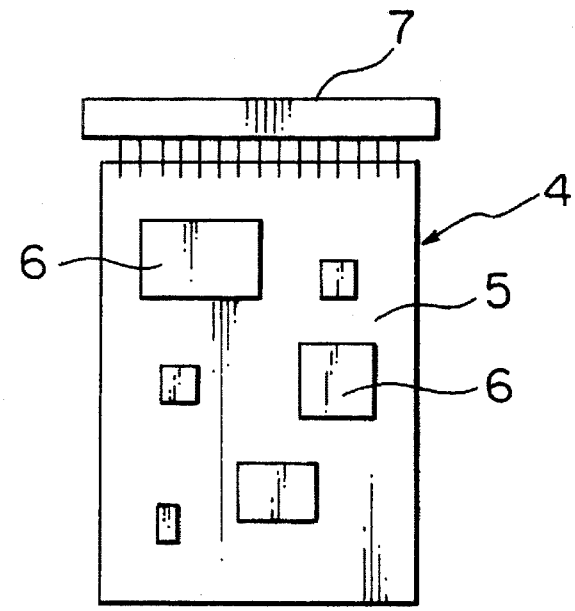
FIG. 7 is a plan view illustrating a module contained in an IC card.
Figure 8:
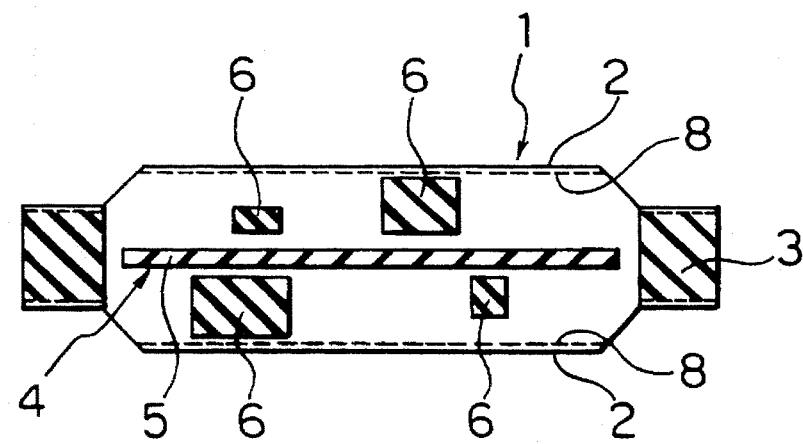
FIG. 8 is a schematic sectional side view illustrating a conventional IC card.

FIGS. 4 A and 4 B are, respectively, an exploded perspective view and a schematic sectional side view illustrating an IC card in accordance with Embodiment 4. In these drawings, projections 9d serving as supporting members are formed integrally, i.e., are unitary with each of the panels 2 using a thermosetting resin or thermoplastic resin. Therefore, the projections 9d can be produced in the process of producing the panels, and thus has the advantage of eliminating the need for an additional production process. In the IC card provided with the projections 9d, the projections 9d receive an external force applied to the panels 2 and can thus prevent deformation of the panels 2 and application of excessive force to the electronic parts 6, thereby effectively protecting the IC card.

Embodiment 5

FIGS. 5A and 5B are side views illustrating the circuit board 5 of an IC card in accordance with Embodiment 5. In these drawings, projections 9e serving as supporting members are formed integrally with the circuit board 5. The electronic parts 6 can thus be protected when the circuit board 5 is covered with panels 2. For example, metallic or plastic pins used as the projections 9e can be provided by using an adhesive or adhesive sheet. In the IC card provided with the projections 9e, the projections 9e receive an external force applied to the panels 2, and thus prevent deformation of the panels and application of excessive force to the electronic parts 6, thereby effectively protecting the IC card.

Although in the embodiments described above spacers having various forms and comprising various materials are used, the spacers are not limited to these spacers, and spacers having forms and comprising materials other than those described above can be used in accordance with the sizes and forms of the electronic parts, and the gap between the electronic parts and the panels. When no gap is present between the electronic parts and the panels, since the electronic parts receive external forces, spacers need not be provided in the vicinities of the electronic parts.

What is claimed is:

1. An IC card comprising:

a circuit board for mounting electronic parts;

a frame surrounding said circuit board;

respective panels covering each of front and back sides of said circuit board and said frame; and a supporting member arranged in a gap between said circuit board and one of said panels for supporting said panel, wherein said supporting member and said circuit board are a unitary body.

2. An IC card comprising:

a circuit board;

electronic parts mounted on said circuit board;

a frame surrounding said circuit board; respective panels covering each of front and back sides of said circuit board and said frame; and a supporting member disposed in a gap between said circuit board and one of said panels for supporting said panel, wherein said supporting member and said one of said panels are unitary.

3. An IC card comprising:

a circuit board;

electronic parts mounted on said circuit board;

a frame surrounding said circuit board;

respective panels covering each of front and back sides of said circuit board and said frame; and a supporting member disposed in a gap between said circuit board and one of said panels, said supporting member including a transverse part in the gap for supporting said panel and a lateral part extending between an electronic part and said panel.

4. The IC card of claim 3 wherein said supporting member includes a second transverse part extending from the lateral part and disposed in the gap between said circuit board and said one of said panels for supporting said panel wherein the electronic part is surrounded on three sides by said supporting member.

* * * * *